United States Patent [19]

Oka

[11] Patent Number: 5,097,789
[45] Date of Patent: Mar. 24, 1992

[54] BATTERY ARRANGEMENT FOR SMALL WATERCRAFT

[75] Inventor: Katsunori Oka, Iwata, Japan

[73] Assignee: Yamaha Hatsudoki Kabushiki Kaisha, Iwata, Japan

[21] Appl. No.: 580,102

[22] Filed: Sep. 10, 1990

[30] Foreign Application Priority Data

Sep. 14, 1989 [JP] Japan ................................ 1-238828

[51] Int. Cl.$^5$ ......................... B63B 35/00; B63B 17/00
[52] U.S. Cl. ................................... 114/363; 180/68.5; 114/270
[58] Field of Search .................. 114/363, 270; 440/6; 180/219, 220, 68.5

[56] References Cited

U.S. PATENT DOCUMENTS

| 3,105,567 | 10/1963 | Schultz, Jr. | 180/68.5 |
| 3,948,206 | 4/1976 | Tyler | 114/270 |
| 4,098,366 | 7/1978 | Reinhard et al. | 180/68.5 |
| 4,616,168 | 10/1986 | Nishida | 114/270 |
| 4,664,054 | 5/1987 | Nishida | 114/270 |

Primary Examiner—Sherman D. Basinger
Attorney, Agent, or Firm—Ernest A. Beutler

[57] ABSTRACT

A battery arrangement in a smaller watercraft is provided wherein the battery is positioned in a compartment located immediately under the seat which is detachably affixed to the hull of the watercraft for affording easy access to the battery for servicing, particularly by a rider of the watercraft. The compartment is preferably watertight and has a top cover which may be detached to obtain direct access to the battery, after the seat is detached.

6 Claims, 3 Drawing Sheets

BATTERY ARRANGEMENT FOR SMALL WATERCRAFT

BACKGROUND OF THE INVENTION

This invention relates to a battery arrangement in a small watercraft, and more particularly to an improved arrangement wherein the battery is contained in an accessible watertight compartment disposed immediately under the seat of the watercraft for affording easy access to the battery for servicing.

One type of popular small watercraft is propelled by a jet propulsion unit and is designed to be operated by a single rider who is seated on the seat in straddle-like fashion. Generally, this type of watercraft has a compartment formed by the lower portion of the hull and the deck of the watercraft wherein an internal combustion engine is contained. Typically, a battery is also positioned within this compartment near the engine. In some watercraft of this type, access to this compartment for storage and/or servicing of the mechanical and electrical components contained therein is sometimes provided by a releasably connected hatch which exposes an opening through the control bridge of the watercraft. However, with this type of arrangement, the battery is usually positioned rearwardly of and at a distance from the hatch opening so as to make it difficult to service. Arrangements have also been proposed where the battery is located below the seat but not immediately under it for easy servicing.

It is therefore a principle object of this invention to provide an arrangement in a small watercraft where the battery is positioned immediately below a detachably affixed seat of the watercraft so that the battery is easily accessible to a rider for servicing.

SUMMARY OF THE INVENTION

This invention is adapted to be embodied in a small watercraft comprising a hull portion which defines a rider's area at the rear of the hull portion, a seat detachably affixed to the hull portion in the rider's area and releasable latching means for detachably affixing the seat to the hull portion. In accordance with the invention, a battery is provided which is contained in a compartment having a detachable top cover and which is located immediately under the seat in a space formed in the base of the seat. The battery is positioned in the compartment so as to be easily accessible to a rider for servicing.

DETAILED DESCRIPTION OF THE PREFERRED EMBODIMENT OF THE INVENTION

Figure 1:
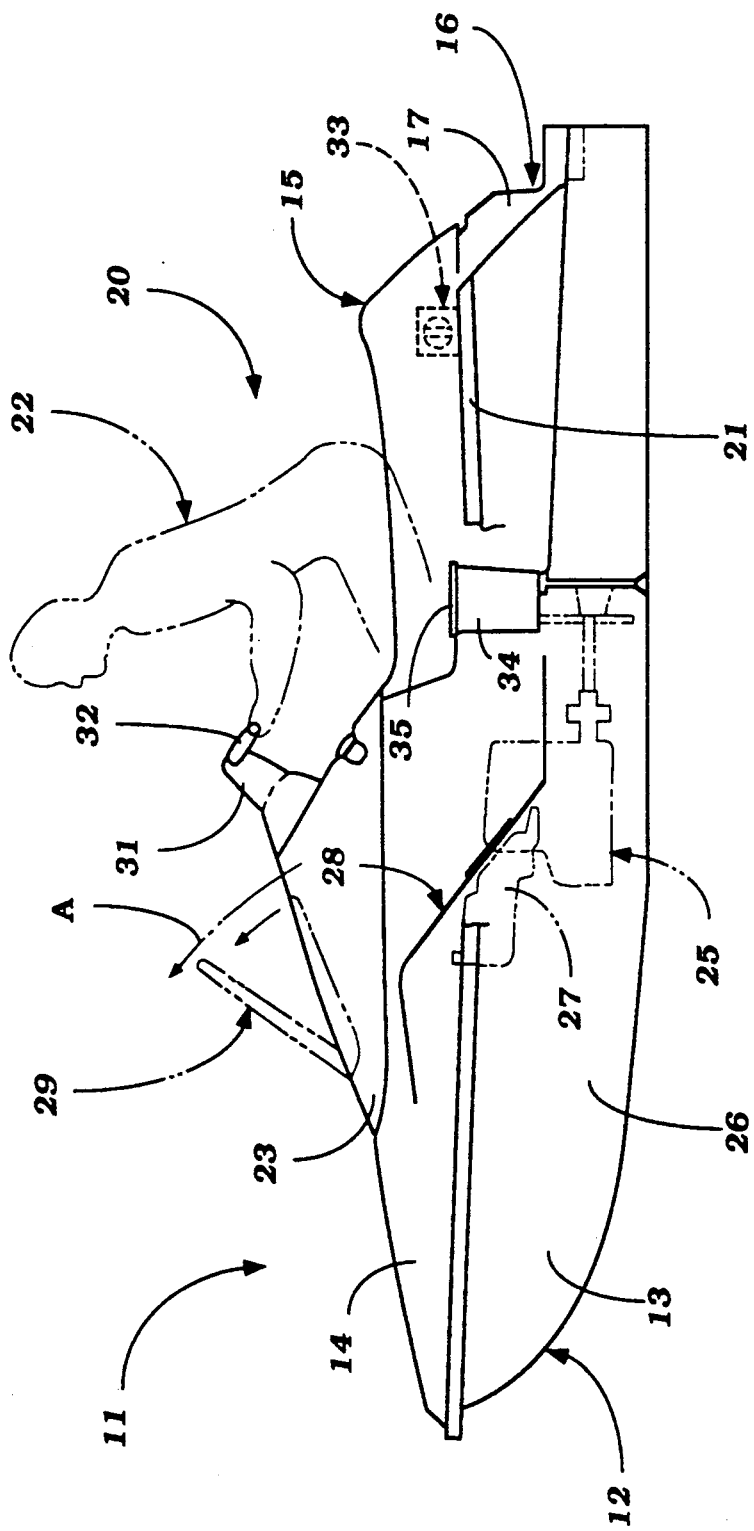
FIG. 1 is a side elevational view of a small watercraft constructed in accordance with the invention and showing a rider in phantom seated on the seat of the watercraft.

Referring first to FIG. 1, a small watercraft constructed in accordance with the invention is identified generally by the reference numeral 11. The small watercraft 11 is depicted as being of the jet-propelled type designed to be operated by a single rider seated in straddle fashion upon a seat 15 of the watercraft 11. It is to be understood, however, that the invention may be utilized in conjunction with other types of watercraft. The invention has, however, particular utility in the type of watercraft described and depicted herein.

The watercraft 11 is comprised of a hull 12 having a lower portion 13 and a deck portion 14 each of which may be formed conveniently from a molded fiberglass reinforced plastic as is well known in this art. A rider's area 20 is provided rearward of the deck 14 and includes a seat 15 which is detachably affixed to a seat base 16 which extends upwardly from the lower hull portion 13 and is defined by sidewalls 17 and a top wall 18 (see FIG. 4). A pair of depressed foot areas 19 (see FIG. 4) are positioned inwardly of raised gunnels 21. A rider, shown in phantom in FIG. 1 and identified generally by the reference numeral 22 may be seated on the seat 15 with his legs in the depressed foot areas 19.

A control bridge 23 is provided forwardly of the seat 15 on the deck 14 and an internal combustion engine, shown in phantom and identified by the reference numeral 25, is positioned beneath the bridge 23 within an engine compartment 26 formed by the lower portion of the hull 13 and the deck portion 14. A fuel tank 27 is positioned forwardly of the engine 25 for providing fuel for the engine 25 and an oil indicator 28 is also located in the engine compartment 26 in close proximity to the engine 25. This internal combustion engine 25 drives a jet propulsion unit which is positioned within a tunnel formed at the rear of the lower portion of the hull 13 beneath the seat 15. The jet propulsion unit may be of any known type but includes a pivotally supported discharge nozzle which is pivotal about a vertically extending axis for steering purposes as is well known in this art.

The propulsion unit and the powering internal combustion engine 25 may be conventional and since the construction thereof is not necessary to understand the construction and operation of the invention, further illustration and description of these components is not believed to be necessary.

The control bridge 23 has a pivotally attached hatch cover 29 which, when in the open position as shown in phantom in FIG. 1, exposes an opening in the control bridge 23 to provide access to the engine compartment 26. The hatch cover 29 can be moved between a closed position and an open position as indicated by the arrow designated by the letter A.

A steering mast 31 is carried by the bridge 23 forwardly of the seat 15 and includes handlebars 32 in a position wherein the rider 22 may conveniently grasp them to steer the discharge nozzle. As is common in this art, a steering lever extends outwardly from one side of the steerable discharge nozzle and is connected by means of a bowden wire to a steering arm formed at the lower end of the steering mast 31 for steering of the watercraft 11.

In accordance with the invention, latching means, in the form of a latching mechanism, indicated generally by the reference numeral 33 is positioned on the side of the seat 15 toward the rear for detachably affixing the seat 15 to the seat base 16. Located immediately under the forward portion of the seat 15 in a space formed in the seat base 16 is a watertight compartment 34 having a detachable top cover 35 for enclosing a battery 36 (see FIGS. 2 and 4).

The latching mechanism 33 for use with this invention may be of the type described and illustrated in the application entitled "Seat Latch For Watercraft", Ser. No. 450.608, filed Dec. 13, 1989 and now U.S. Pat. No. 5,048,450 in the name of Katsunori Oka and assigned to the assignee of the this application. The disclosure of this application is incorporated herein by reference.

Figure 2:
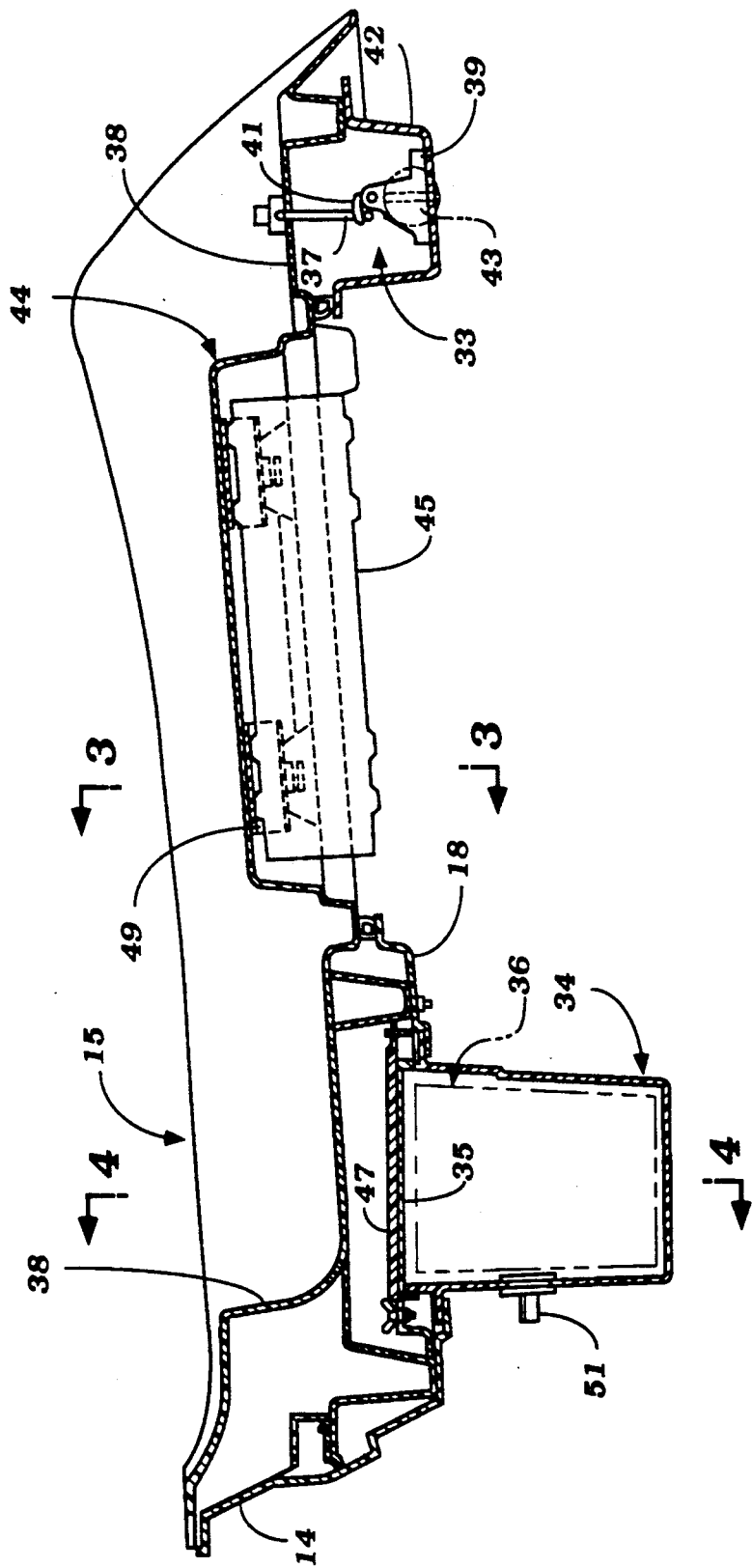
FIG. 2 is a cross-sectional view taken along the longitudinal centerline of the watercraft.

Referring to FIG. 2, the latching mechanism 33 comprises a generally hook shaped keeper 37 that is affixed to a mounting member which is, in turn, affixed to a bottom wall 38 of the seat 15 by means of bolt and nut assemblies. The latching mechanism 33 further includes a cooperating latching member 39 which comprises a latch hook 41 which is pivotally supported on a mounting bracket by means of a pivot pin. This mounting bracket is, in turn, secured to the bottom wall portion 42 of a cavity in which the keeper 37 and latching member 39 are contained. A rotatable operator 43 is provided for releasing the latch hook 41 from the keeper 37. The operator 43 is comprised of a knob-like member that is affixed to the outer surface of the operator 43 so as to be accessible at the side of the seat 15.

Figure 3:
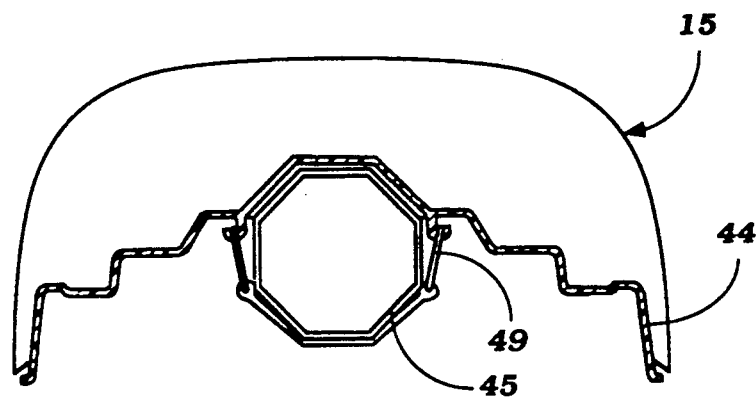
FIG. 3 is a cross-sectional view taken along line III—III of FIG. 2.

Referring now primarily to FIG. 3 but also to FIG. 2, a cavity 44 is formed in the seat base 16 rearwardly of the space in which the watertight compartment 34 is contained. This cavity 44 has a storage compartment 45 held in place therein by a support member which is attached to the bottom wall 38 of the seat 15 by elastic bands 49. This cavity 44 can be conveniently used for storing small articles and the like during operation of the watercraft 11.

Figure 4:
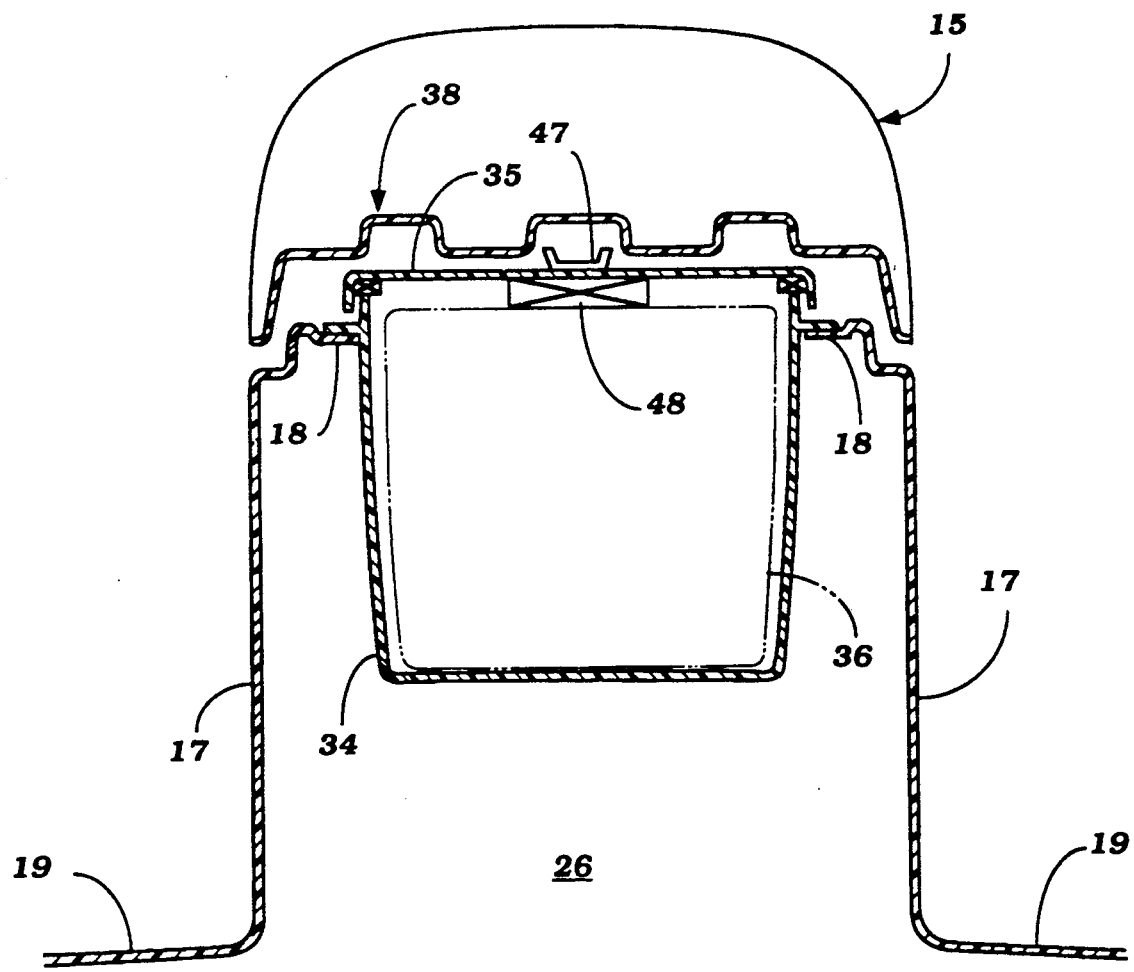
FIG. 4 is a cross-sectional view taken along line IV—IV shown in FIG. 2.

Referring now to FIG. 4, in addition to FIG. 2, it will be seen that the watertight compartment 34 is located immediately under the forward portion of the seat 15 in a space formed within the seat base 16 as aforenoted. The battery 36 is held in place within this watertight compartment 34 by means of a press plate 47, and a pad 48 positioned between the detachable top cover 35 and the battery 36. As shown in FIG. 2, an electric cable 51 extends through the compartment 34 to provide electrical communication between the battery 36 and the mechanical components. To obtain access to the battery 36, the seat 15 is detached from the seat base 16, the press plate 47 is disengaged from the top cover 35, the top cover 35 is detached and pad 48 is removed so that the battery 36 may be removed. With this arrangement, the battery 36 is positioned in the watertight compartment 34 so as to be easily accessible to a rider for servicing.

From the foregoing description, it should be readily apparent that a simple yet highly effective arrangement has been provided for a small watercraft wherein the battery may be easily serviced by a rider of the watercraft. It is to be understood, however, that the foregoing description is that of a preferred embodiment of the invention and that various changes and modifications may be made without departing from the spirit and scope of the invention, as defined by the appended claims.

I claim:

1. A small watercraft comprising a hull portion defining a rider's area at the rear of said hull portion, a seat detachably affixed to said hull portion in said rider's area, releasable latching means for detachably affixing said seat to said hull portion, a first compartment formed in said hull portion, an engine positioned in said first compartment, a second compartment having a detachable top cover and located immediately under said seat in a space formed under said seat, said second compartment being separate from said first compartment, and a battery positioned in said second compartment so as to be easily accessible to a rider for servicing.

2. A small watercraft as recited in claim 1, further comprising a press plate above the detachable top cover and a pad positioned between the detachable top cover and said battery for holding said battery in place within said second compartment.

3. A small watercraft as recited in claim 1, wherein said second compartment is watertight.

4. A small watercraft as recited in claim 1, wherein said releaseable latching means comprises a keeper and a latching member including a latch hook releasably engageable with said keeper.

5. A small watercraft as recited in claim 4, wherein said releaseable latching means further comprises an operator for releasing said latch hook from said keeper.

6. A small watercraft as recited in claim 1, wherein said first compartment is formed forwardly of said seat.

* * * * *